United States Patent
Zoratti et al.

(10) Patent No.: US 7,227,474 B2
(45) Date of Patent: Jun. 5, 2007

(54) OBJECT DETECTION SYSTEM: ZONE MATCHING AND PROGRAMMABILITY

(75) Inventors: Paul K. Zoratti, South Lyon, MI (US); Joe C. Attard, Dearborn, MI (US)

(73) Assignee: Vistoen Global Technologies, Inc., Van Buren Township, MI (US)

( * ) Notice: Subject to any disclaimer, the term of this patent is extended or adjusted under 35 U.S.C. 154(b) by 139 days.

(21) Appl. No.: 11/042,036

(22) Filed: Jan. 25, 2005

(65) Prior Publication Data

US 2006/0176160 A1    Aug. 10, 2006

(51) Int. Cl.
- B60Q 1/00 (2006.01)
- G06F 17/10 (2006.01)
- G06G 7/78 (2006.01)
- G08G 1/16 (2006.01)

(52) U.S. Cl. .................. 340/988; 340/435; 701/301
(58) Field of Classification Search ........ 340/435–437; 342/70–72, 46, 47; 701/301
See application file for complete search history.

(56) References Cited

U.S. PATENT DOCUMENTS

| | | | |
|---|---|---|---|
| 5,008,678 A | 4/1991 | Herman ...................... 342/158 |
| 5,243,354 A | 9/1993 | Stern et al. ................. 343/700 |
| 5,369,409 A | 11/1994 | Urabe et al. ................ 342/133 |
| 5,724,042 A | 3/1998 | Komatsu et al. ............ 342/175 |
| 5,787,369 A * | 7/1998 | Knaak .......................... 701/19 |
| 5,878,362 A * | 3/1999 | Sekine et al. ................. 701/41 |
| 5,940,011 A | 8/1999 | Agravante et al. .......... 340/903 |
| 6,018,308 A * | 1/2000 | Shirai .......................... 342/70 |
| 6,577,269 B2 * | 6/2003 | Woodington et al. ....... 342/196 |
| 6,642,908 B2 * | 11/2003 | Pleva et al. ................. 343/876 |
| 2003/0083818 A1 * | 5/2003 | Tojima ....................... 701/301 |
| 2004/0257266 A1 | 12/2004 | Pleva et al. |
| 2005/0090955 A1 * | 4/2005 | Engelman et al. ............ 701/36 |
| 2005/0134440 A1 * | 6/2005 | Breed .......................... 340/435 |

* cited by examiner

*Primary Examiner*—Benjamin C. Lee
*Assistant Examiner*—Jennifer Mehmood
(74) *Attorney, Agent, or Firm*—Brinks Hofer Gilson & Lione

(57) ABSTRACT

The object detection system includes an object sensor and a controller. The controller is configured to compare a sensed range of an object with a range gate based on the azimuth angle of the object. The range gate for each azimuth angle is programmable and is selected to form a contiguous sensing region closely matching the shape of a desired detection zone. The object sensor is switchable between the plurality of sensing fields, wherein a range gate for each sensing field is programmable to form a contiguous sensing region. The object sensor may be a variety of range sensors including radar, ultrasonic, laser or infrared technologies. The range gate and parameters of the sensing field are each programmable through a controller. Further, the controller may automatically vary the range gate or sensing field based on vehicle parameters.

15 Claims, 6 Drawing Sheets

OBJECT DETECTION SYSTEM: ZONE MATCHING AND PROGRAMMABILITY

BACKGROUND

1. Field of the Invention

The present invention generally relates to an object detection system for a vehicle.

2. Description of Related Art

Automotive remote sensing systems are being developed to provide a variety of functional features involving the detection of objects in the near vicinity of the host vehicle. These remote sensing systems can be referred to as near obstacle detection systems (NODS). Individual NODS applications can provide various functional features such as side object detection, parking assistance, backup assistance, and pre-impact sensing. For these NODS applications, the sensing system is responsible for detecting and locating objects within a defined detection zone around the vehicle. The size and shape of the detection zone for which the sensing system must provide coverage varies with the functional features provided by the NODS application. For example, FIG. 1 shows the potential detection zones for various NODS applications. These zones include side object detection 12, side pre-impact 14, front park aid 16, stop and go cruise control 18, and backup/rear parking aid 20 located at various positions relative to the vehicle 10.

Many of the detection zones, in FIG. 1, are at least partially square or trapezoidal in shape. This poses a compatibility issue for many sensor technologies. Typically, a mismatch exists between the sensors coverage area, which is commonly defined by the sensor's radiation pattern or optical field of view, and the desired detection zone. Simple sensing systems which utilize radar, ultrasonic, capacitive, and certain types of infrared technologies provide coverage areas which are more elliptical or lobed in shape.

The side object detection zone 12 will be used to further illustrate the problem. FIG. 2 illustrates the detection zone for a typical side obstacle warning application. The dimensions of the side object detection zone 12 are dependent upon the desired level of system functionality, as well as, the dimensions of the particular host vehicle 10. For example, a side obstacle warning system designed to notify drivers of adjacent obstacle maneuvers would typically have a length extending from the location of the outside rearview mirror to several meters behind the rear bumper of the vehicle. The width would extend from the vehicle surface to perhaps ¾ of the adjacent lane. In the sample dimensions of FIG. 2, the detection zone extends from the outside rearview mirror, six meters towards the rear of the vehicle, and 3.5 meters towards the adjacent lane.

FIG. 3 illustrates the mismatch problem between a simple sensor coverage area, in the case of a radar radiation pattern, and the desired side obstacle warning detection zone. In FIG. 3, the coverage area 21 is depicted in the form of a lobed shape as would be provided by a simple, single beam radar sensor. An object located within the coverage area 21 will be detected by the radar and its range can be obtained by a number of widely known methods. The arc 23 in the coverage area 21 is a constant range from the sensor and defines a sensing zone 22. The range information is used to determine whether an object is located within arc 23 defining sensing zone 22. As such, the sensing zone 22 is used to approximate the desired side object detection zone 12. For example, when an object is detected within a specified range, it is declared to be within the side object detection zone 12, otherwise it is declared not to be in the side object detection zone 12. The problem with this type of implementation is clearly evident, the mismatch between the sensor's sensing zone 21 and the desired side object detection zone 12 results in substantial missed detection areas 26 or false alarm areas 24.

In view of the above, it is apparent that there exists a need for an improved object detection system.

SUMMARY

In satisfying the above need, as well as overcoming the enumerated drawbacks and other limitations of the related art, the present invention provides an improved object detection system.

The object detection system includes an object sensor for determining the range of an object, and a controller for comparing the sensed range with a range gate based on the azimuth angle of the object.

In another aspect of the present invention, the object detection system includes an object sensor switchable between the plurality of sensing fields, wherein a range gate for each sensing field is programmable to form a contiguous sensing region. Each of the sensing fields generally has a sensing angle of between 20° and 40° and the controller is configured to compare a range of a sensed object in each sensing field to a range gate corresponding to the sensing field. The range gate for each sensing field is selected to form a contiguous sensing region closely matching the shape of a desired detection zone. The object sensor may be a variety of range sensors including radar, ultrasonic, laser or infrared technologies. In the case of a radar sensor, the radar includes a patch array antenna and a plurality of feed networks that may be multiplexed between the radar electronics and the patch array antenna, such as a butler matrix. Alternatively, other radar processing techniques that provide azimuth information (such as mono-pulse or antenna scanning) may be utilized. In such a case, the range gates are specified and applied based on the azimuth information for each detected object.

The range gate and parameters of the sensing field are each programmable through a controller. Further, the controller may automatically vary the range gate or sensing field based on vehicle parameters. The vehicle parameters may include vehicle speed, a turn indicator, steering wheel angle, or steering wheel rate. Alternatively, the controller may be in communication with a navigation system, as such, the vehicle parameters may include navigation related parameters such as road classification. For ease of use, the controller may be connected to a user interface allowing the driver to adjust the sensing zone. Alternatively, the object detection system may include a transmitter/receiver in communication with a remote programming device, such that the contiguous sensing region may be modified by a remote service person.

Further objects, features and advantages of this invention will become readily apparent to persons skilled in the art after a review of the following description, with reference to the drawings and claims that are appended to and form a part of this specification.

DETAILED DESCRIPTION

Figure 1:
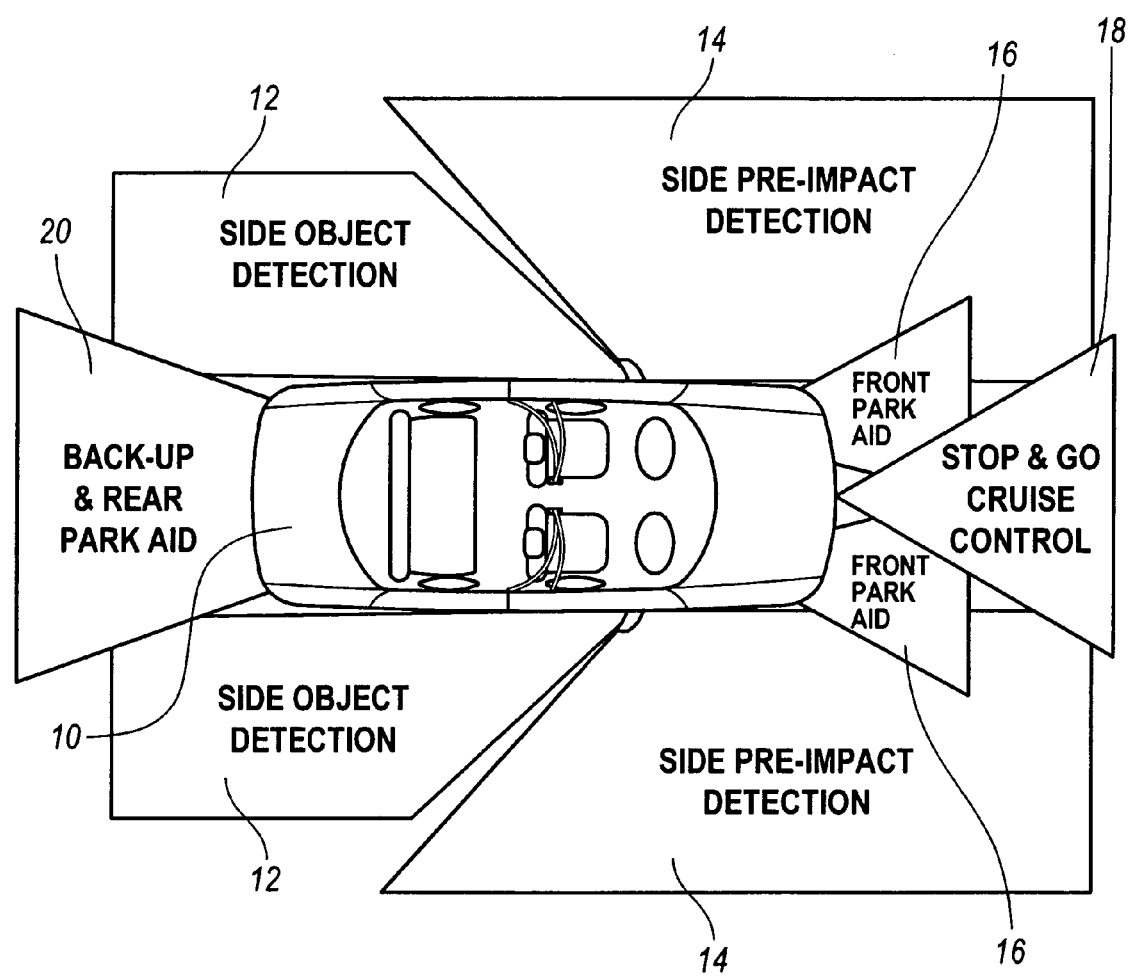
FIG. 1 is a top view illustrating object detection zones for various NODS applications.
Figure 2:
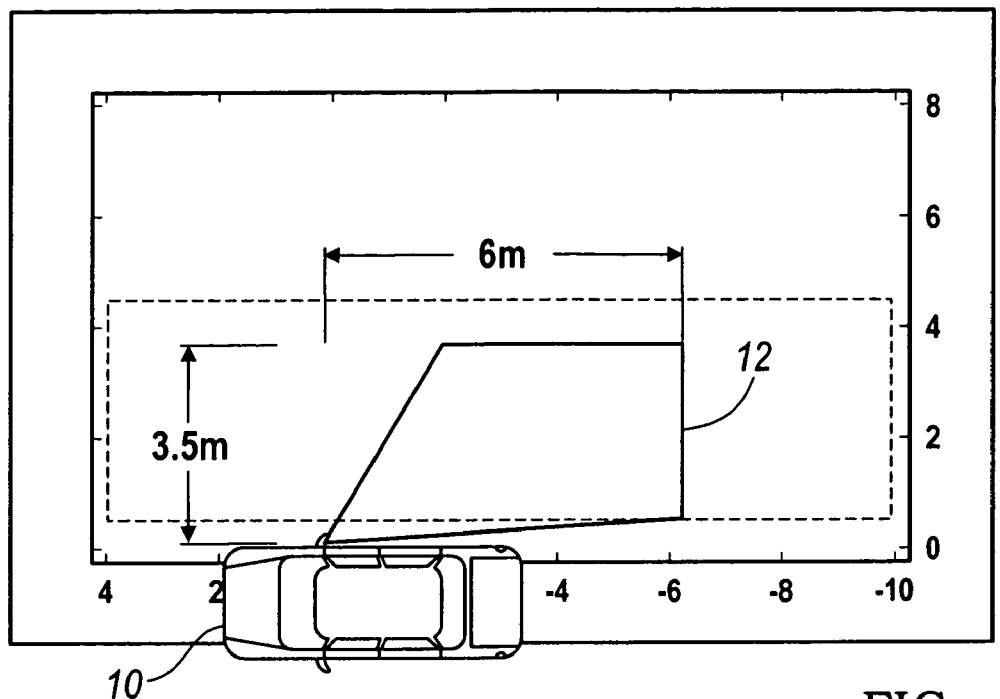
FIG. 2 is a top view of a side object detection zone.
Figure 3:
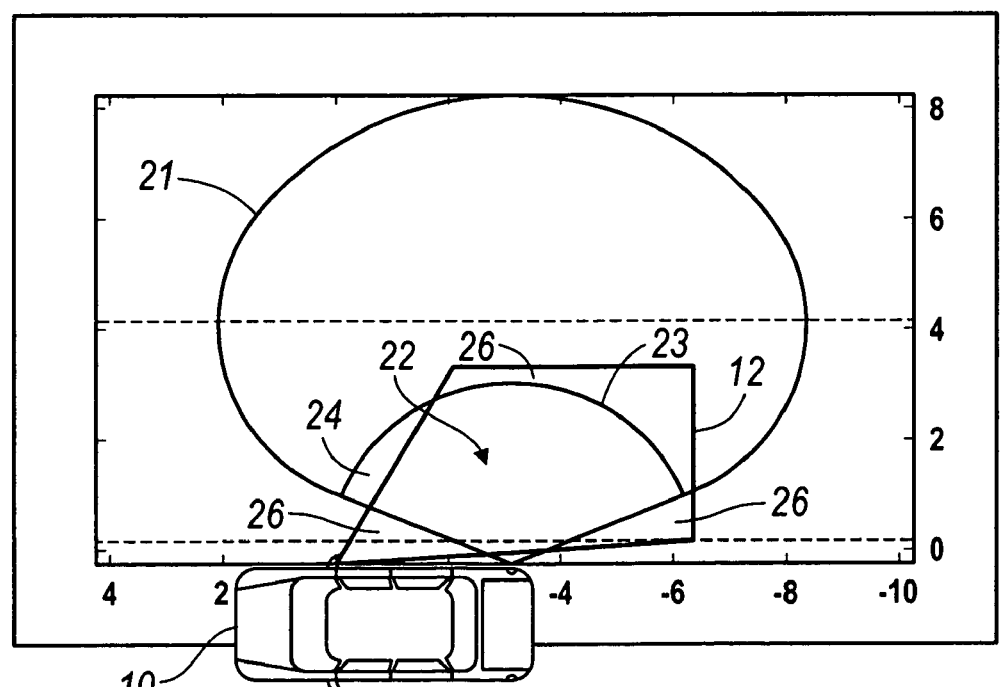
FIG. 3 is a top view of a side object detection zone and the sensor coverage area to illustrate false alarms and missed detections.
Figure 4:
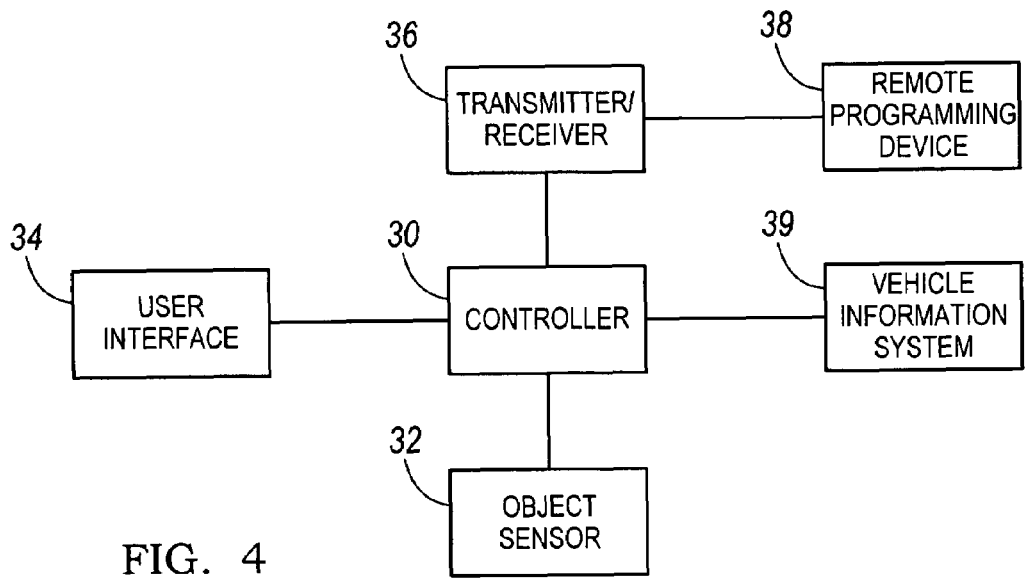
FIG. 4 is a diagrammatic view of the object detection system in accordance with the present invention.

Referring now to FIG. 4, an object detection system embodying the principles of the present invention is illustrated therein and designated at 10. As its primary components, the object detection system 10 includes a controller 30 and an object sensor 32. The controller 30 is in electrical communication with the object sensor 32. The object sensor 32 may be a variety of range sensors including technologies such as radar, ultrasonic, infrared, or laser including monopulse technology. As such, the object sensor 32 may also determine an azimuth angle of object using, for example, monopulse technology. If the object sensor 32 determines the azimuth angle of the object, the azimuth angle is provided to the controller 30 by the object sensor 32.

Figure 5:
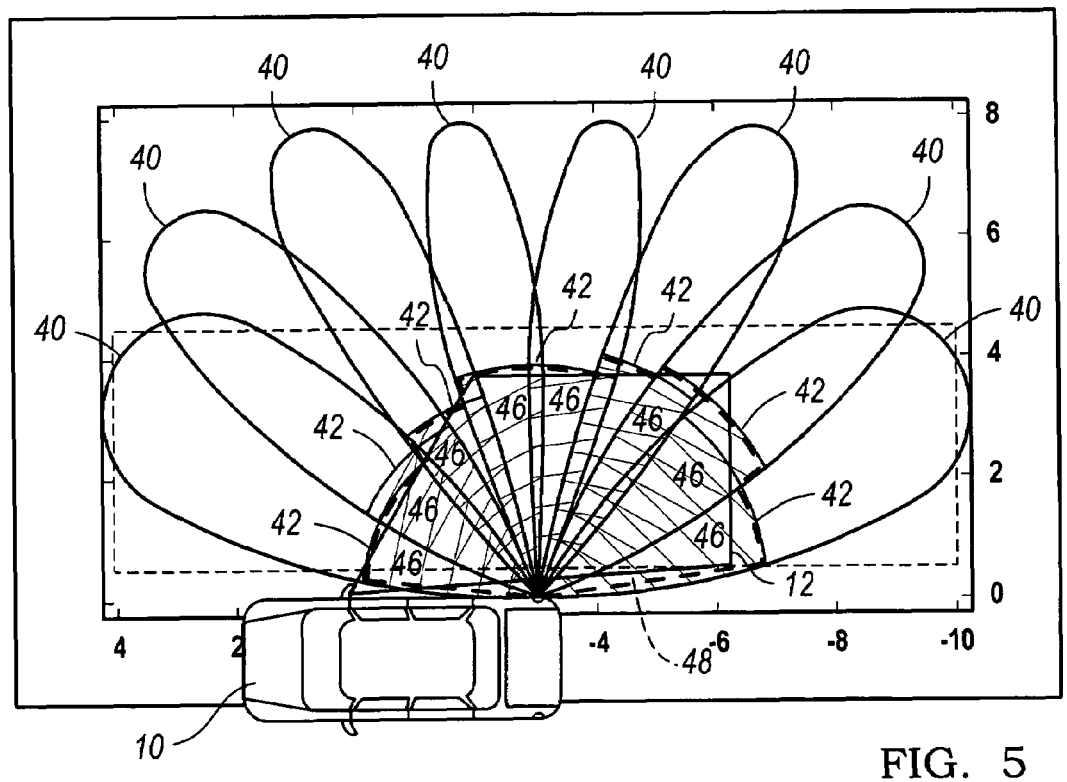
FIG. 5 is a top view of a vehicle illustrating a multiple sensing field technique and the corresponding coverage area.

Further, the controller 30 controls the object sensor 32 with regard to the sensor's sensing field 40 and range gate 42, as shown in FIG. 5. The sensing field 40 includes the angle and distance within which the sensor can detect an object. The range gate 42 is a distance from the sensor where the sensing field 40 and desired detection zone overlap. As such, if the object is detected and has a range less than the range gate 42, the object will be determined as within the desired detection zone 43. As such, the object sensor 32 switches between multiple intermediate sized sensing fields 40 to provide an adequate match between the sensor coverage area 48 and the desired detection zone 43. The programmability of the sensing fields 40, and ultimately the sensor coverage area 48, allows a single base sensor design to support multiple vehicle platforms of different dimensions and a variety of detection zone shape preferences. Furthermore, programmability of the sensing fields 40 allow for accurate range and azimuth positioning of the detected objects to support advanced functionality features such as parking aid and precrash sensing. As such, the controller 30 may store the sensing field or fields where objects are detected. Using the stored sensing field the controller can determine the azimuth angle of the object detected.

Still referring to FIG. 5, eight sensor fields 40, forming the sensor coverage area 48, are overlaid on the desired detection zone 43. Each sensor field 40 has a range gate 42, shown as an arc, near the boundary of the desired detection zone 43. The individual sensor fields 40 overlap and are combined to create a contiguous sensor coverage area 48 which closely approximates the desired detection zone 43.

The object sensor 32 switches between the eight sensor fields 40 and measures the range to any object located within that specific sensor field 40. The object's range is then evaluated by the controller to determine if the object is within the predetermined range gate 42 for that particular sensing field 40. If the object is within the range gate 42, the system activates an indicator to notify the operator of the objects presence within the desired detection zone 43. The use of multiple narrow sensing fields 40 provides a crude azimuth information required to determine object position and produce a close match between the sensor coverage area 48 and the desired detection zone 43. The width of the sensing fields 40, as shown, vary from 20° to 35°. A number of sensing fields 40 used may depend on the level of zone matching compliance desired and the area of the desired detection zone 43.

Referring again to FIG. 4, the controller 30 is also in communication with a user interface 34 allowing individual drivers of the vehicle to manipulate the desired detection zone and ultimately the sensing fields and range gates based on driver preference. Alternatively, the controller 30 may be in communication with a transmitter receiver 36. The transmitter receiver 36 may be in communication with a remote programming device 38 via radio frequency, mobile technology, satellite communication technology, or other suitable remote communication technology. As such, the driver may communicate with a service person who may remotely adjust the desired detection zone based on the driver preference. Both the remote programming device 38 and the user interface 34 may directly manipulate the sensing angle and projection angle of the sensing fields, as well as, the associated range gate. Alternatively, the user may define the desired detection zone and the controller 30 calculate the range gate and sensing field parameters to minimize mismatches between the sensor coverage area and the desired detection zone.

The controller 30 is also in communication with a vehicle information system 39. The vehicle information system 39 includes access to vehicle parameters such as vehicle speed, turn indicator, steering wheel angle, and steering wheel rate. The controller 30 is configured to alter the sensor coverage area, or more specifically the range gate and sensing field parameters, based on the vehicle parameters. For example, the width of the side obstacle warning system may be 3.5 meters when the vehicle is traveling at speeds greater than 55 mph, but shrink to 2 meters when the vehicle is traveling below 55 mph. In addition, the vehicle information system 39 may include a navigation system and the controller 30 may alter the sensor coverage area based on navigation information, such as, road classification.

Figure 6:
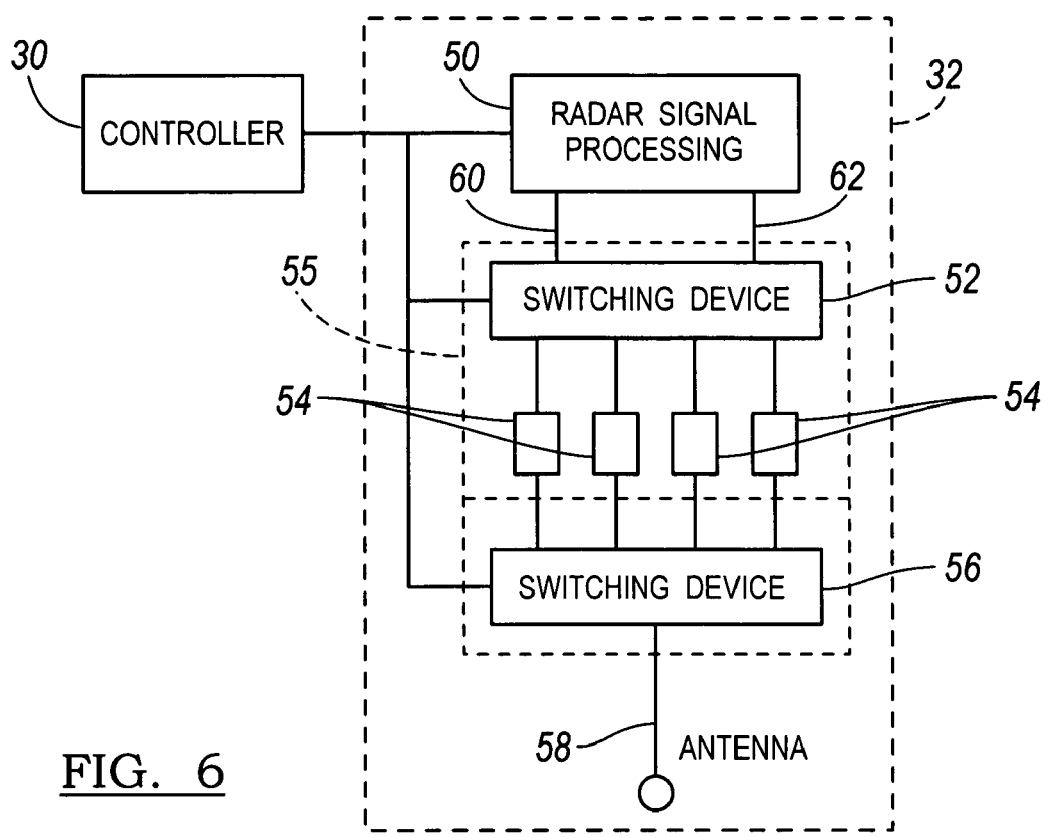
FIG. 6 is a diagrammatic view of the object detection system in a radar implementation.
Figure 7A:
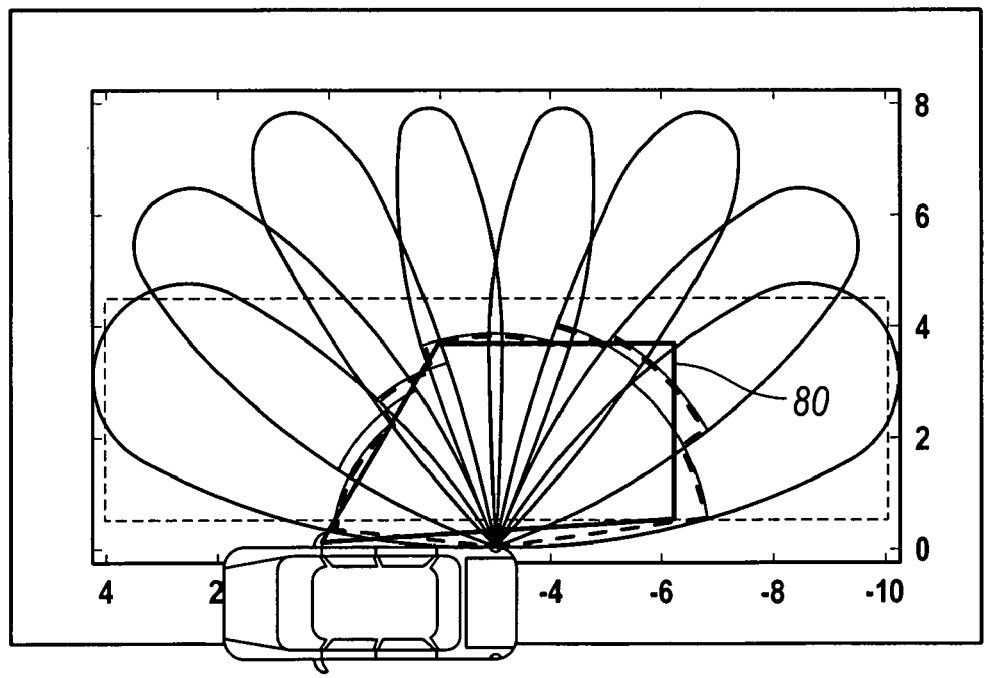
FIGS. 7a-7d are top views of various desired detection zones in the corresponding coverage area based on various vehicle platforms and vehicle parameters.
Figure 7B:
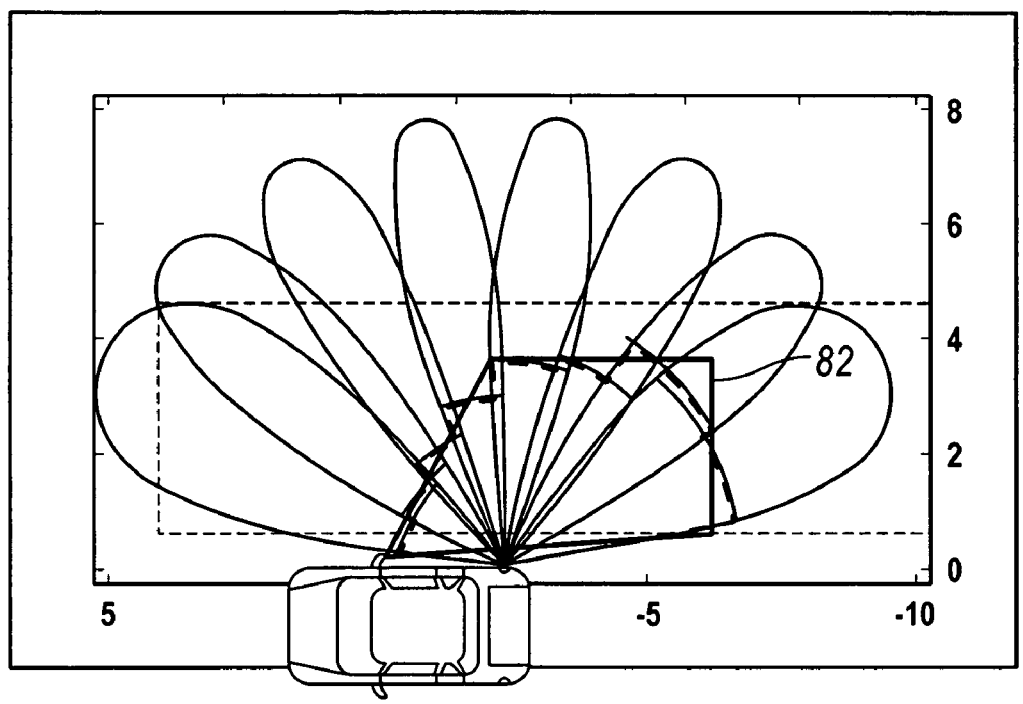
Figure 7C:
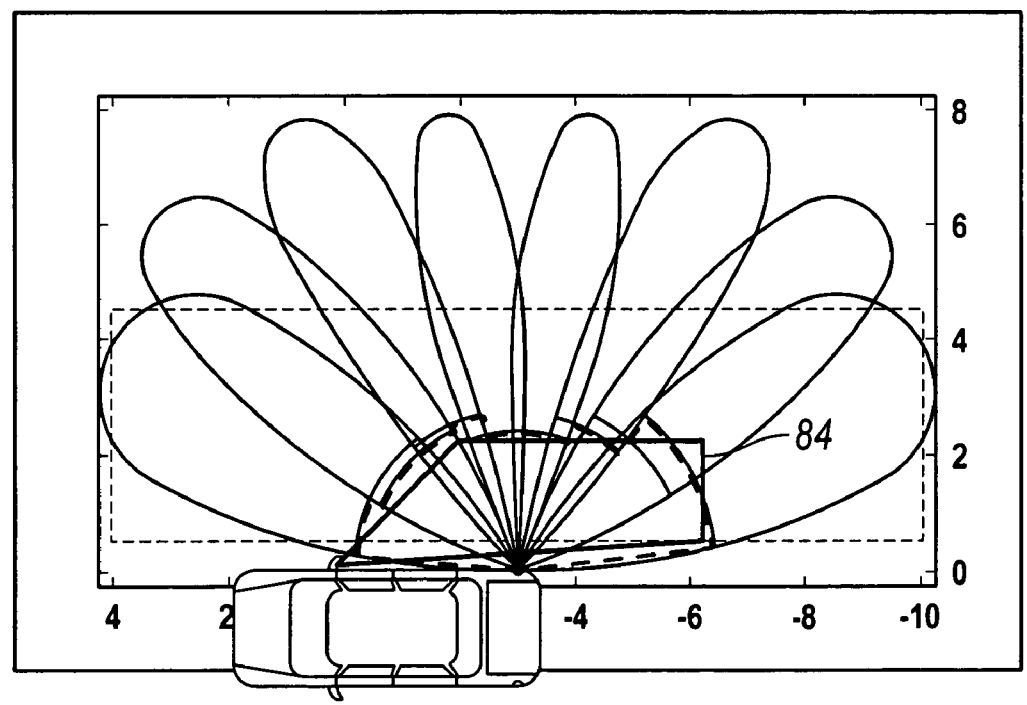
Figure 7D:
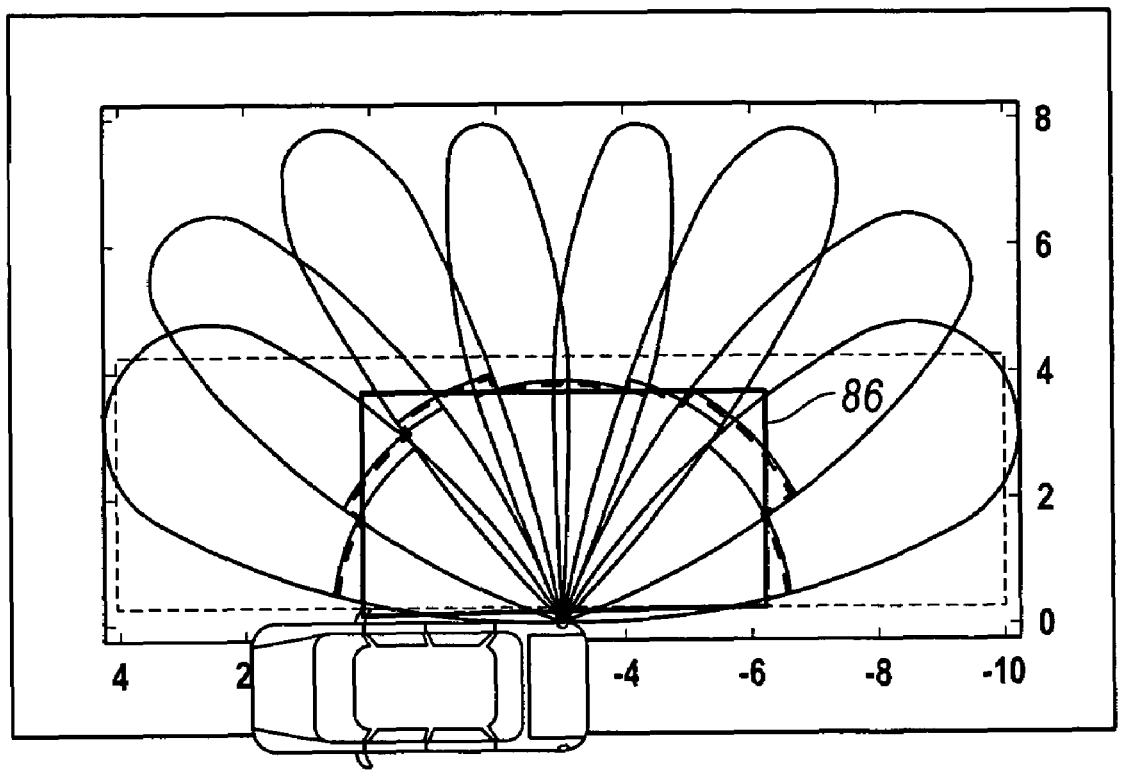

Now referring to FIG. 6, the object sensor 32 is shown in a radar implementation. The object sensor 32 includes a radar signal processing unit 50 including a transmitter output 60 and a receiver input 62. To provide cost effective radar electronics, the transmitter output 60 and receiver input 62 may be switched between a plurality of field networks 54, where each field network 54 has a fixed phasing length. Each field network 54 is then selectively connected to a patch array antenna 58. The system utilizes a patch array antenna 58 with a relatively simple feed network, such as a butler matrix 55, which can be implemented on a multilayer ceramic carrier. This implementation does not require a large aperture antenna to generate a very narrow beam even at frequencies as low as 14 GHz. Further, there is no complex mechanical scanning mechanism or costly phased array componentry. The transmitter output 60 and receiver input 62 of the radar can be multiplexed by multiple switching devices 52, 56 switched between the ports of the feed network which directs the beam appropriately through fixed phasing lengths and to the antenna patches. As such, the sensing angle and projection angle of the sensing field may be manipulated.

Possible detection zone variations are depicted in FIGS. 7a-7d. For example, the detection zone may be varied based on the vehicle shape or size. The detection zone for a large vehicle as denoted by reference numeral 80, may extend further beyond the end of the vehicle and have a different range gate configuration than the detection zone for a compact vehicle as denoted by reference numeral 82. Similarly, the shape of the detection zone may be altered based on vehicle parameters or user preference, such as, a narrow detection zone as denoted by reference numeral 84 at slow speeds, or a square detection zone 86 at a high vehicle speed.

Programmability of the object sensor allows a single base sensor to be manufactured for a variety of applications and platforms. The single base sensor will allow for economies of scale which make the sensors affordable for automotive use. In addition, features supported by these sensors are new to the automotive market and the preferred detection zones may readily change based on consumer input. By adjusting a range gates, OEMs and service stations can change the systems detection zone without changing the actual sensor. Further, the operator may be provided direct control over the detection zone shape via dashboard controls or by calling a remote service such as Onstar™.

As a person skilled in the art will readily appreciate, the above description is meant as an illustration of implementation of the principles of this invention. For example, in lieu of implementing multiple sensing fields, other radar sensor implementations that provide azimuth information on detected objects can be utilized. In such a case, the range gates would be specified and applied based on the azimuth information rather than the sensing field. This description is not intended to limit the scope or application of this invention in that the invention is susceptible to modification, variation and change, without departing from spirit of this invention, as defined in the following claims.

We claim:

1. An object detection system for a vehicle, the object detection system comprising: an object sensor configured to sense a range of an object; a controller configured to compare the range to a range gate of a plurality of range gates, each range gate corresponding to an azimuth angle; and wherein the range gate for each azimuth angle is programmable to form a contiguous sensing region wherein the object sensor is switchable between a plurality of sensing fields and the controller is configured to determine an object azimuth angle based on a sensing field of the plurality of sensing fields.

2. The object detection System according to claim 1, wherein each sensing field has a sensing angle of between 20 and 40°.

3. The object detection system according to claim 1, wherein the object sensor is a radar sensor.

4. The object detection system according to claim 3, wherein the radar sensor includes a patch array antenna.

5. The object detection system according to claim 3, wherein the radar sensor includes a butler matrix.

6. The object detection system according to claim 4, wherein the radar sensor includes a transmitter output and a receiver input, the transmitter output and receiver input are switched between a plurality of feed networks, each feed network having a fixed phasing length and being selectively connected to the patch array antenna.

7. The object detection system according to claim 1, wherein the range gate for each sensing field is determined based on vehicle parameters.

8. The object detection system according to claim 7, wherein the vehicle parameters include vehicle speed.

9. The object detection system according to claim 7, wherein the vehicle parameters include a turn indicator.

10. The object detection system according to claim 7, wherein the vehicle parameters include a steering wheel angle.

11. The object detection system according to claim 7. wherein the vehicle parameters include a steering wheel angle rate.

12. The object detection system according to claim 7, wherein the vehicle parameters include a navigation system output.

13. The object detection system according to claim 12, wherein the navigation system output includes a road classification.

14. The object detection system according to claim 1, further comprising a user interface.

15. The object detection System according to claim 1, further comprising a transmitter receiver in communication with a remote programming device, such that the contiguous sensing region may be modified via the remote programming device.

* * * * *

UNITED STATES PATENT AND TRADEMARK OFFICE
CERTIFICATE OF CORRECTION

PATENT NO. : 7,227,474 B2
APPLICATION NO. : 11/042036
DATED : June 5, 2007
INVENTOR(S) : Paul K. Zoratti et al.

It is certified that error appears in the above-identified patent and that said Letters Patent is hereby corrected as shown below:

On the Title Page

In column 1, item (73), delete "Vistoen" and substitute --Visteon-- in its place.

In the Claims

Column 6, in claim 15, line 36, after "The object detection" delete "System" and substitute --system-- in its place.

Signed and Sealed this

Fourteenth Day of August, 2007

JON W. DUDAS
*Director of the United States Patent and Trademark Office*